(12) United States Patent
Le Docte

(10) Patent No.: US 8,875,518 B2
(45) Date of Patent: Nov. 4, 2014

(54) NACELLE WITH AN ADAPTABLE OUTLET SECTION

(75) Inventor: Thierry Jacques Albert Le Docte, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 1239 days.

(21) Appl. No.: 12/674,237

(22) PCT Filed: Jun. 19, 2008

(86) PCT No.: PCT/FR2008/000859
§ 371 (c)(1),
(2), (4) Date: Feb. 19, 2010

(87) PCT Pub. No.: WO2009/024660
PCT Pub. Date: Feb. 26, 2009

(65) Prior Publication Data
US 2011/0214747 A1    Sep. 8, 2011

(30) Foreign Application Priority Data

Aug. 20, 2007 (FR) ..................... 07 05920

(51) Int. Cl.
*B64D 29/06* (2006.01)
*B64D 33/04* (2006.01)
*F02K 1/08* (2006.01)

(52) U.S. Cl.
CPC . *B64D 33/04* (2013.01); *F02K 1/08* (2013.01); *F02K 1/085* (2013.01); *B64D 29/06* (2013.01)
USPC ............... 60/770; 60/39.1; 60/771; 60/226.3; 239/265.27

(58) Field of Classification Search
CPC ........ B64D 33/04; B64D 29/06; F02C 7/042; F02C 7/20; F02K 1/04; F02K 1/08; F02K 1/085
USPC ............ 60/226.3, 770, 771, 39.1; 239/265.27
See application file for complete search history.

(56) References Cited

U.S. PATENT DOCUMENTS

| 3,263,417 | A | * | 8/1966 | Hooker ........................... 60/771 |
| 3,598,318 | A | * | 8/1971 | Schiel ....................... 239/265.13 |
| 3,721,389 | A | * | 3/1973 | MacKinnon et al. .... 239/265.19 |
| 3,750,983 | A | * | 8/1973 | Morris ............................ 244/54 |
| 3,964,257 | A | * | 6/1976 | Lardellier .................... 60/226.1 |

(Continued)

FOREIGN PATENT DOCUMENTS

| EP | 0867366 | 9/1998 |
| WO | 2005/021934 | 3/2005 |

OTHER PUBLICATIONS

International Search Report; PCT/FR2008/000859; Dec. 19, 2008.

*Primary Examiner* — Phutthiwat Wongwian
*Assistant Examiner* — Jason H Duger
(74) *Attorney, Agent, or Firm* — Brinks Gilson & Lione

(57) ABSTRACT

The present invention relates to a jet engine nacelle (1) comprising an aft section (5) having an internal structure (9) intended to surround an aft portion of an engine compartment and to define, with an exhaust nozzle (6), a calibrated outlet section for the ventilation of the engine compartment by way of spacing means arranged in the outlet section, characterized in that the spacing means are divided into rigid spacing means (11) designed to provide a constant spacing and into compensating means (13) designed so as to be able to adapt to the relative movements of the jet engine with respect to the nacelle.

9 Claims, 6 Drawing Sheets

(56) References Cited

U.S. PATENT DOCUMENTS

| | | | |
|---|---|---|---|
| 4,232,513 A * | 11/1980 | Pearson et al. | 60/39.091 |
| 4,271,666 A * | 6/1981 | Hurley et al. | 60/226.1 |
| 4,825,644 A * | 5/1989 | Bubello et al. | 60/39.091 |
| 4,961,588 A * | 10/1990 | Brienza | 277/545 |
| 5,054,281 A * | 10/1991 | Mutch | 60/39.83 |
| 5,110,050 A * | 5/1992 | Nightingale | 239/265.39 |
| 5,174,525 A * | 12/1992 | Schilling | 244/54 |
| 5,524,846 A * | 6/1996 | Shine et al. | 244/53 R |
| 5,577,381 A * | 11/1996 | Eigenbrode et al. | 60/226.1 |
| 5,632,493 A * | 5/1997 | Gardner | 277/411 |
| 5,704,207 A | 1/1998 | Jensen et al. | |
| 5,729,969 A * | 3/1998 | Porte | 60/226.1 |
| 5,778,659 A * | 7/1998 | Duesler et al. | 60/226.1 |
| 5,887,822 A * | 3/1999 | Thornock et al. | 244/53 R |
| 5,906,097 A * | 5/1999 | Hebert et al. | 60/226.1 |
| 6,070,407 A * | 6/2000 | Newton | 60/226.1 |
| 6,751,944 B2 * | 6/2004 | Lair | 60/226.3 |
| 7,010,905 B2 * | 3/2006 | Lair | 60/226.1 |
| 7,188,417 B2 * | 3/2007 | Weeks | 29/890.01 |
| 7,614,210 B2 * | 11/2009 | Powell et al. | 60/226.3 |
| 8,250,852 B2 * | 8/2012 | Porte et al. | 60/226.1 |
| 8,434,309 B2 * | 5/2013 | Levasseur | 60/771 |
| 2003/0126856 A1 * | 7/2003 | Lair | 60/262 |
| 2005/0229585 A1 * | 10/2005 | Webster | 60/226.1 |
| 2007/0245739 A1 * | 10/2007 | Stretton et al. | 60/728 |
| 2013/0227952 A1 * | 9/2013 | Grip et al. | 60/770 |
| 2013/0266448 A1 * | 10/2013 | Blin et al. | 416/219 R |

* cited by examiner

NACELLE WITH AN ADAPTABLE OUTLET SECTION

TECHNICAL FIELD

The disclosure relates to a jet engine nacelle for an aircraft.

BACKGROUND

An aircraft is propelled by two or more turbojets, each housed in a nacelle which also encloses a series of associated activating devices connected to its operation and performing various functions when the turbojet is running or stopped. These associated activating devices may include in particular a mechanical system for operating thrust reversers.

A nacelle usually has a tubular structure comprising an air inlet forward of the turbojet, a middle section designed to surround a fan of the turbojet, and a rear section which encloses thrust reverser means, is designed to surround the turbojet combustion chamber, and usually ends in an exhaust nozzle whose outlet is situated downstream of the turbojet.

Modern nacelles are often designed to enclose a turbofan capable of generating by means of the blades of the rotating fan a hot airflow (also called the primary flow) leaving the turbojet combustion chamber.

A nacelle usually has an outer fixed structure (OFS), which defines, with an inner concentric structure of the rear section, termed the inner fixed structure (IFS), surrounding the structure of the turbojet proper to the rear of the fan, an annular flow channel, also termed the secondary stream, designed to channel a secondary flow of cold air around the outside of the turbojet.

The fixed inner structure and the exhaust nozzle define an engine compartment ventilation outlet section whose main purpose is to renew the air flowing between the IFS and the engine, but which can be used to recover some of the thrust lost by the air taken from the secondary stream by controlling the geometry of the cross-sectional area of the airflow. For this purpose, spacer means in the form of rigid spacers are positioned in the outlet section and held in place by belting.

In flight, however, the turbojet has a tendency to twist, in a different way from the nacelle. This causes very large loadings of said engine compartment on the nacelle.

BRIEF SUMMARY

The disclosure seeks to solve the above problem, and for this purpose its subject is a nacelle for a turbojet comprising a rear section having an inner fixed structure designed to surround a rear part of an engine compartment and to define, with an exhaust nozzle, a calibrated outlet section for the ventilation of the engine compartment using spacer means located in the outlet section, characterized in that the spacer means are divided into rigid spacer means designed to provide a constant gap, and compensating means designed to be able to adapt to the relative movements of the turbojet with respect to the nacelle.

Thus, the decoupling of the spacer means in this way makes it possible to greatly limit the stresses the nacelle has to withstand owing to the deformation of the turbojet.

The compensating means are, in an exemplary embodiment, attached to the rigid spacer means.

The compensating means are, in an exemplary embodiment, also designed to form a valve. This is a considerable advantage inasmuch as the spacer means will therefore be able to adapt to a pressure increase occurring in the engine compartment. The compensating means will therefore be able to be arranged in such a way as to retract under the action of this pressure increase, so that an extra passage will be opened in order to increase the exhausted airflow.

In a first embodiment, the rigid spacer means are fixed inside the inner fixed structure.

In a second embodiment, the rigid spacer means are fixed inside the exhaust nozzle.

The rigid spacer means advantageously comprise a plurality of U-shaped elements forming spacers distributed around the periphery of the outlet section.

In accordance with an exemplary embodiment, the compensating means comprise a plurality of elements having a first end attached to the rigid spacer means, and a free second end.

The compensating means are, in an exemplary embodiment, made in the form of a ring comprising a plurality of longitudinal slots forming longitudinal fingers.

In accordance with the first embodiment, the free second end of each element is pressed against the exhaust nozzle.

According to the second embodiment, the free second end of each element is pressed against the inner fixed structure.

The disclosure also relates to an aircraft characterized in that it comprises at least one nacelle according to the disclosure.

BRIEF DESCRIPTION OF THE DRAWINGS

Implementation of the disclosure will be understood more clearly from a perusal of the detailed description set out below with reference to the appended drawing, in which.

DETAILED DESCRIPTION

Figure 1:
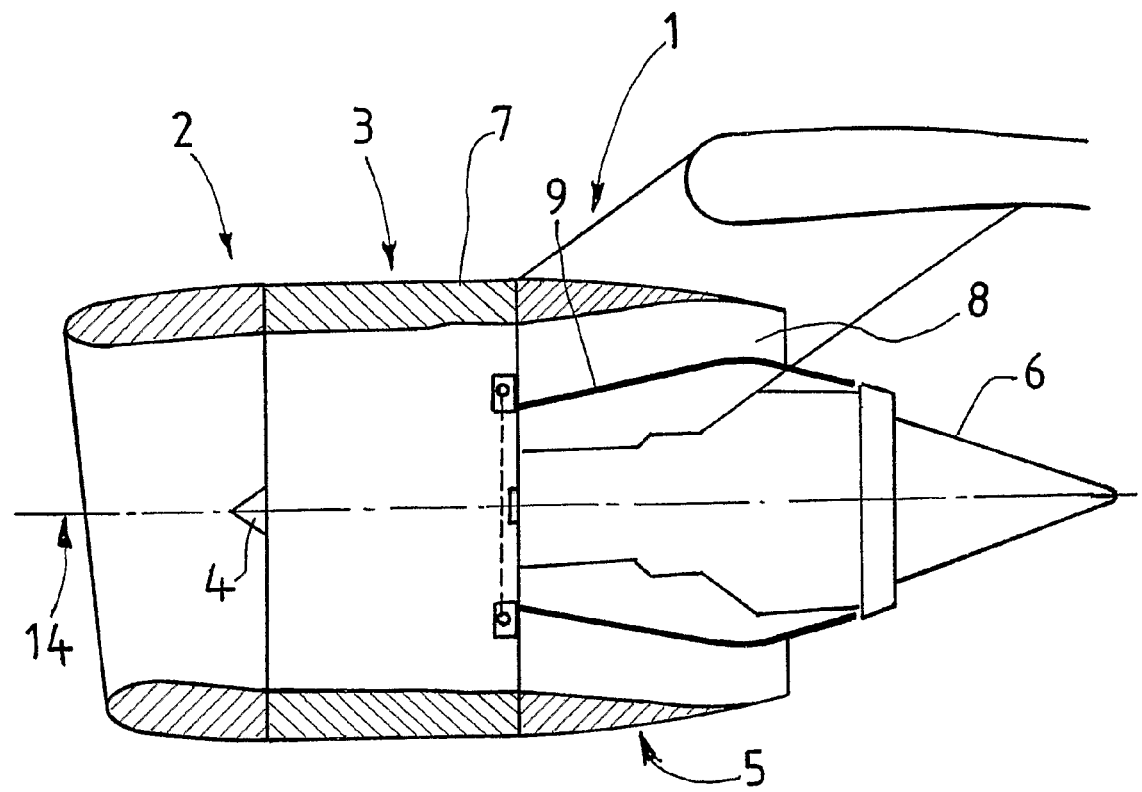
FIG. 1 is a schematic view in longitudinal section of a nacelle according to an embodiment in a closed state.
Figure 2:
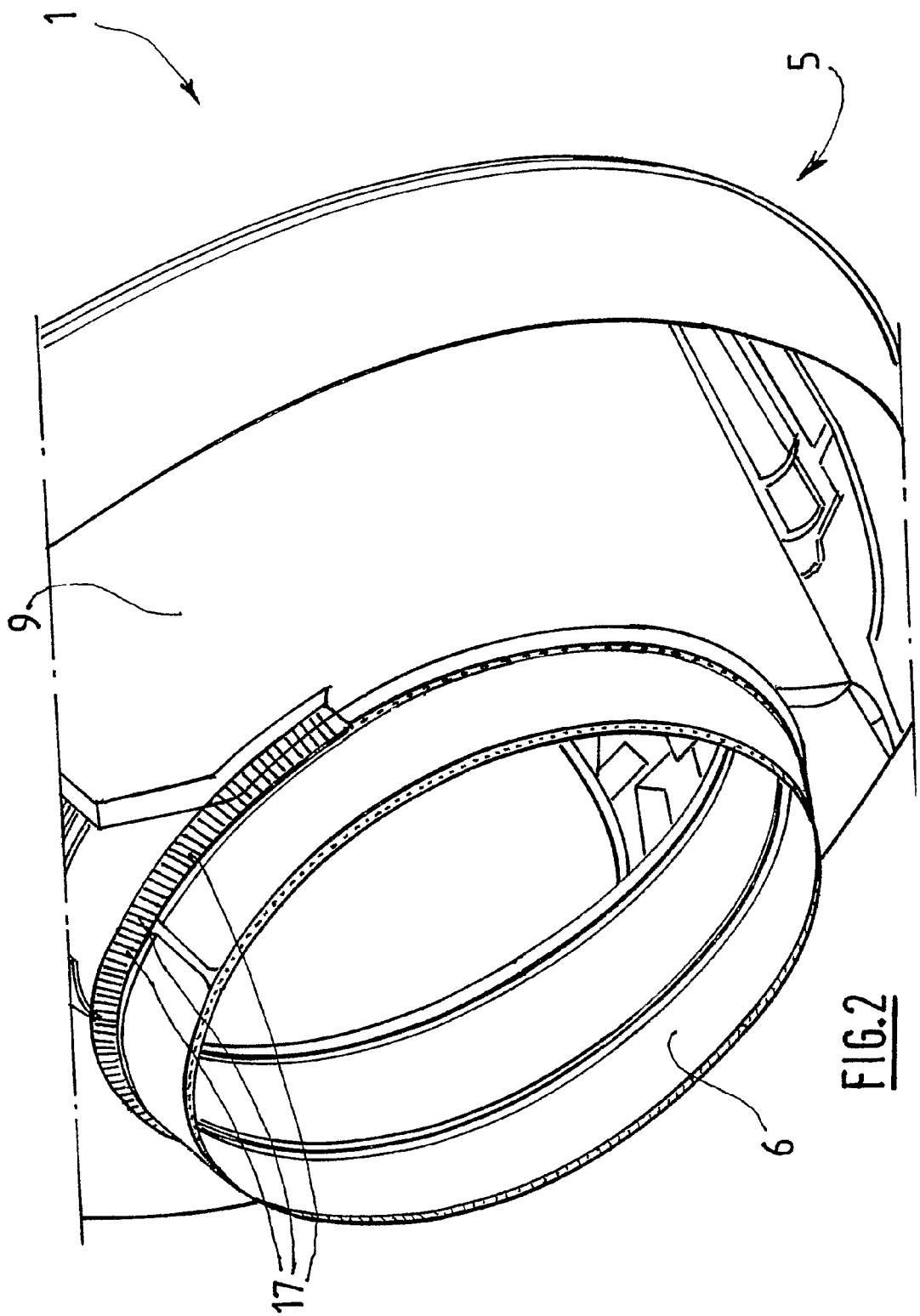
FIG. 2 is an enlarged diagrammatic perspective view from the rear of the nacelle shown in FIG. 1.

A nacelle 1 of an aircraft according to an exemplary embodiment as shown in FIGS. 1 and 2, comprises in a manner known per se a front air inlet section 2, a middle section 3 designed to surround the fan 4, and a rear section 5 designed to surround an engine compartment (not shown), ending in an exhaust nozzle 6 whose outlet is situated to the rear of the turbojet.

This nacelle 1 comprises an outer fixed structure, or OFS, 7 which defines an annular flow channel 8 with a concentric inner fixed structure, or IFS, 9 surrounding the structure of the turbojet proper to the rear of the fan 4.

The inner fixed structure 9 and the exhaust nozzle 6 define an outlet section 10 for the ventilation of the engine compartment, which can be used to recover some of the thrust lost by the air taken from the annular channel 8 by controlling the geometry of the cross-sectional area of the airflow.

For this purpose, and as shown more precisely in FIGS. 3-6, spacer means made of metal, particularly titanium, are arranged in the outlet section 10.

These spacer means are divided into rigid spacer means 11, 12 designed to provide a constant gap, and compensating means 13 designed to be able to adapt to the relative movements between the turbojet and the nacelle 1.

More precisely, the rigid spacer means 11, 12 are made from a plurality of U-section elements forming spacers.

The rigid spacer means 11 are arranged in such a way that the free arms of the U are parallel to the axis 14 of the nacelle 1, and directed forward.

The rigid spacer means 12 are positioned in such a way as to be positioned in a plane normal to the axis 14 of the nacelle 1 as shown in FIGS. 1 through 4.

Figure 3:
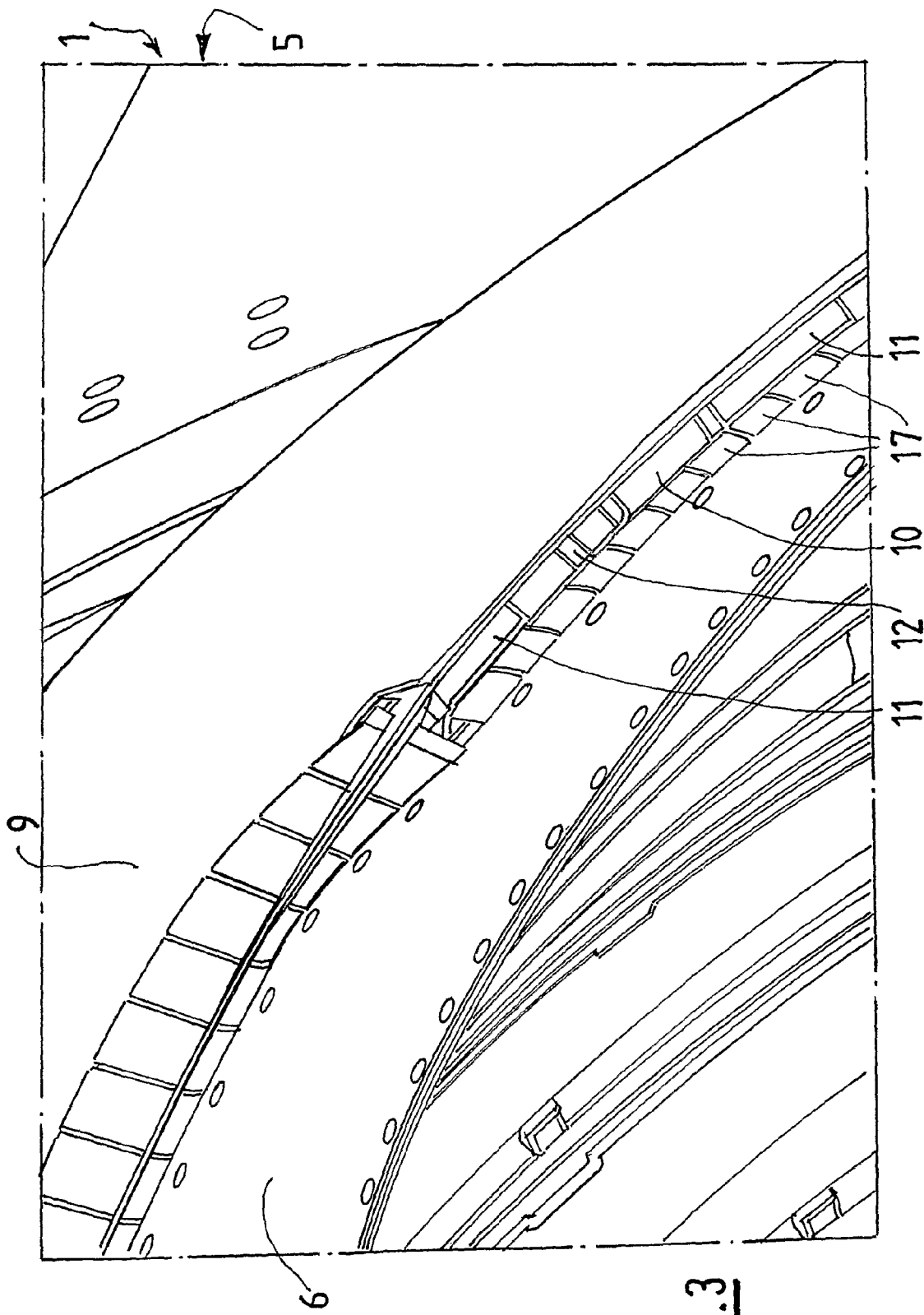
FIG. 3 is an enlarged schematic view of the outlet section from the rear of the nacelle shown in FIG. 2.
Figure 4:
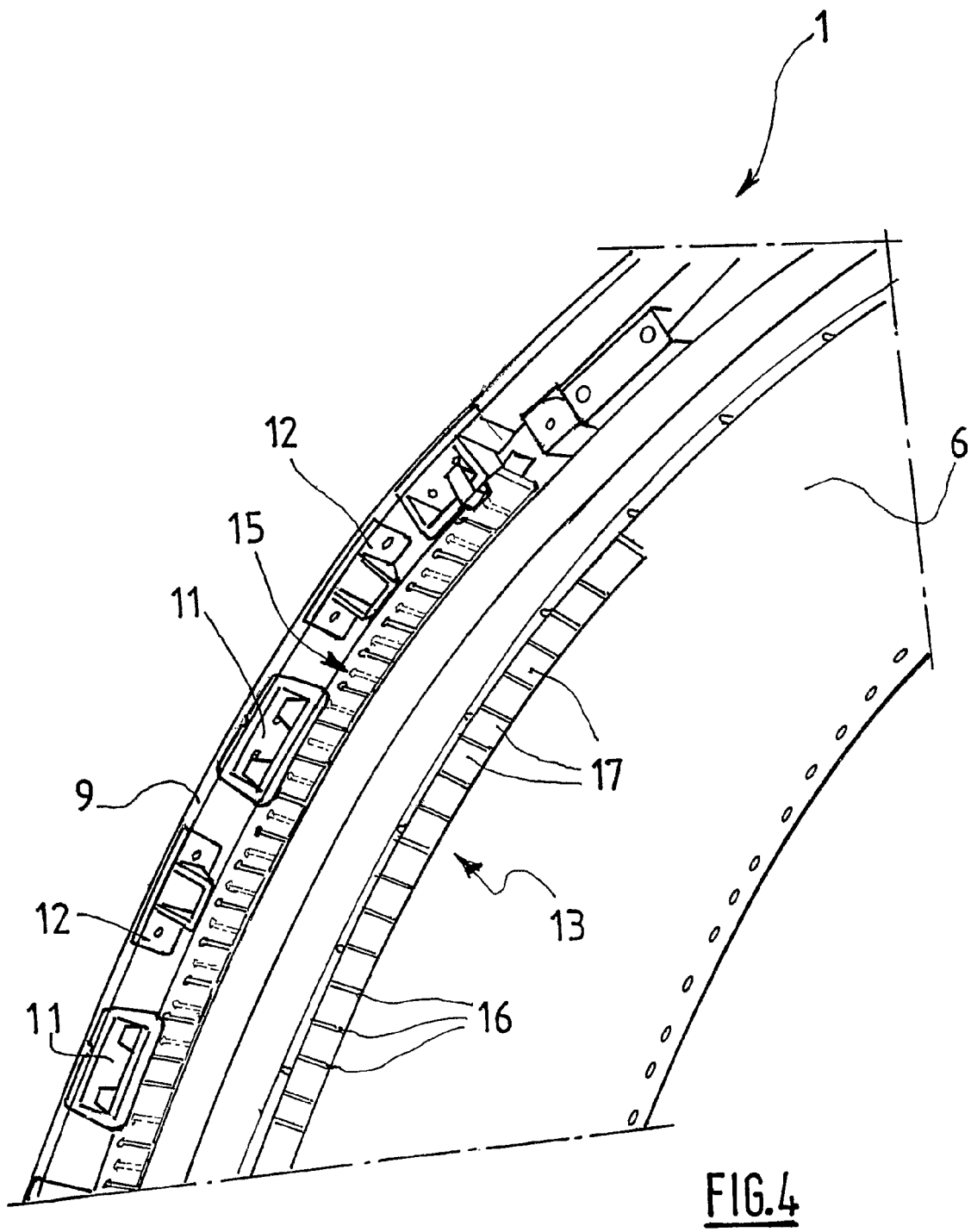
FIG. 4 is a partial schematic view from the front of the outlet section shown in FIG. 3.

The rigid spacer means 11, 12 are uniformly distributed in one plane around the periphery of the outlet section 10, in such a way that one rigid spacer means 12 is inserted between two rigid spacer means 11, as shown more especially in FIGS. 3 and 4.

Figure 5:
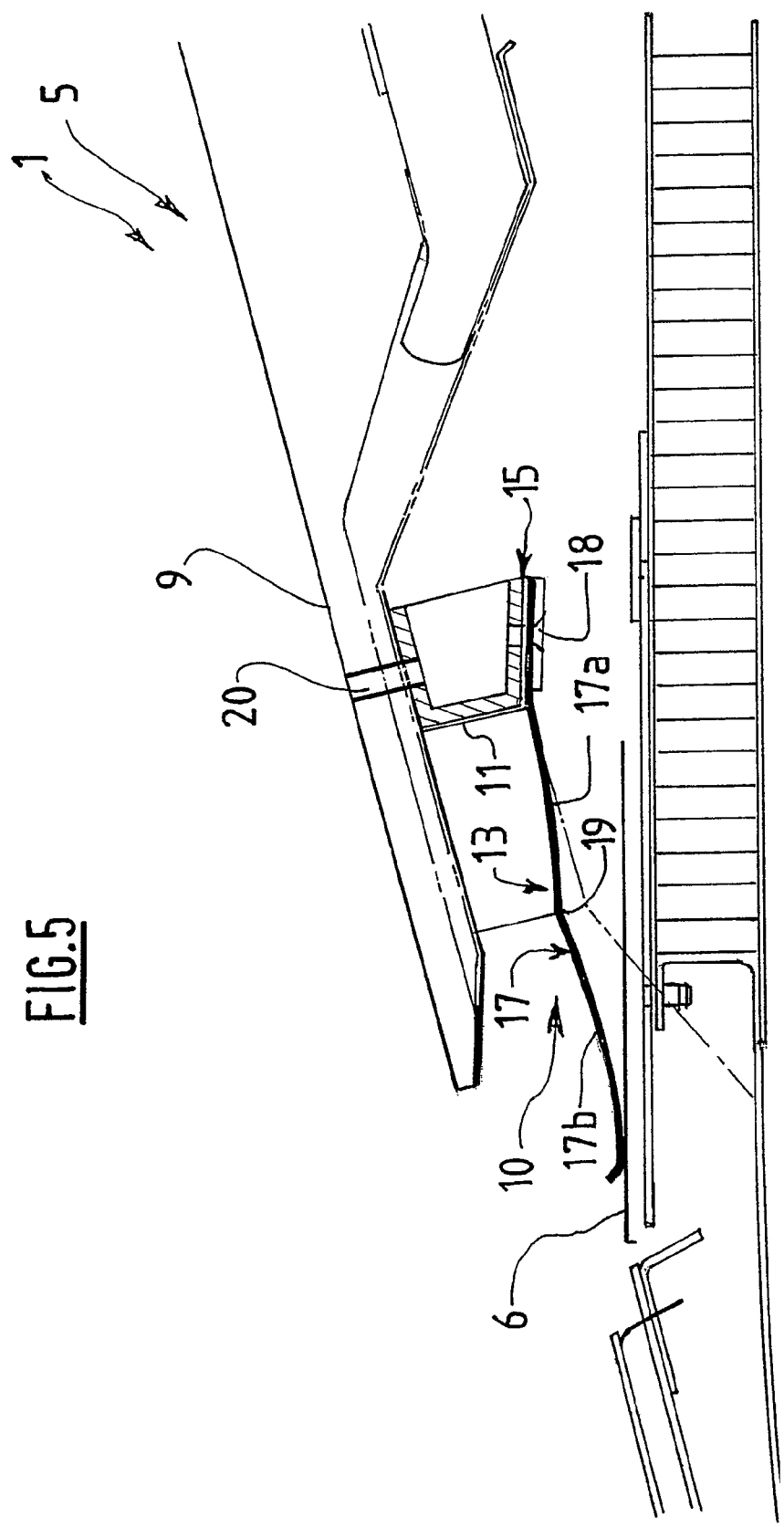
FIG. 5 is a schematic view in longitudinal section of the outlet section of the nacelle shown in FIG. 1.

The rigid spacer means 11, 12 are each riveted in the inner fixed structure 9, as shown schematically in FIG. 5 under reference 20.

The spaces between the various rigid spacer means 11, consequently define passages allowing calibrated ventilation at the outlet section 10.

The same applies to the space formed in each rigid spacer means 12, which also defines a passage allowing calibrated ventilation at the outlet section 10.

Referring to FIG. 4, it will be observed that the compensating means 13 are made in the form of a ring 15 comprising a plurality of longitudinal slots 16 forming longitudinal fingers 17 parallel to the axis 14.

This ring 15 is fixed with rivets 18 in each of the rigid spacer means 11, 12 at the forward end of each finger 17, and the free rear end of the latter presses on the outside face of the exhaust nozzle 6.

The spacer means 11 thus have in particular the function of forming stops in the event of large relative movements of the engine with respect to the nacelle 1, in addition to keeping the forward end of each finger 17 in position. The spacer means 12 meanwhile have the function of keeping the forward end of each finger 17 in position without obstructing the ventilation outlet 10.

More precisely, each finger 17 comprises schematically a first or forward portion 17a connected to a second or rear portion 17b by an elbow 19.

This finger 17 is designed in such a way that, once the ring 15 is fixed in the rigid spacer means 11, 12, the second portion 17b has to be moved radially away in order to be able to press it against the exhaust nozzle 6. Each finger 17 is therefore constantly in tension, as the second portion 17b attempts to recover its rest position shown schematically in chain lines in FIG. 5.

In this way, by dividing the spacer means into such rigid spacer means 11, 12 on the one hand, and such compensating means 13 on the other, the stresses which the nacelle 1 has to be able to cope with from the deformation of the turbojet are greatly limited.

Figure 6:
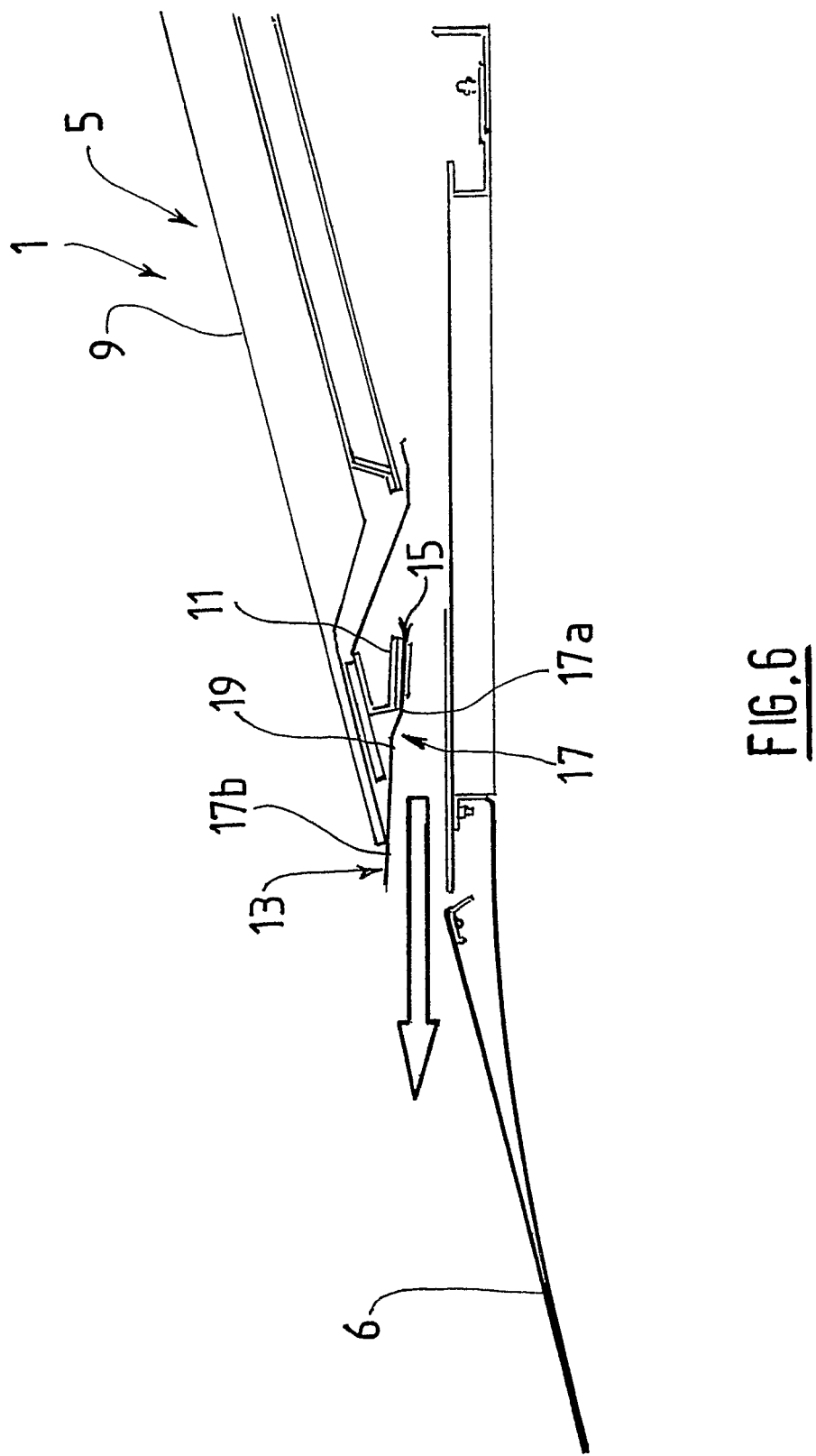
FIG. 6 is a schematic view similar to FIG. 5, during a pressure increase in the combustion chamber of the turbojet.

Moreover, these fingers 17 are designed in such a way as to form a valve. This is a considerable advantage inasmuch as the compensating means 13 can therefore adapt to a pressure increase occurring in the engine compartment, as shown in FIG. 6. Specifically, the second portion 17b of each finger 17 is able to move radially away from the exhaust nozzle 6 under the force of this pressure increase, and therefore a supplementary passage, indicated by the arrow, is opened up in order to increase the exhausted airflow.

Although the disclosure has been described in relation to particular illustrative embodiments, it will be obvious that it is in no way limited to these and that it encompasses all technical equivalents of the means described, and combinations thereof, where these are within the scope of the disclosure.

The invention claimed is:

1. A nacelle for a turbojet comprising:
   an inner fixed structure;
   a combustion chamber that generates a primary flow;
   an exhaust nozzle that exhausts the primary flow;
   an aft end of the inner fixed structure partially overlaps a forward end of the exhaust nozzle, the inner fixed structure having a larger diameter than the exhaust nozzle;
   wherein an outer surface of the exhaust nozzle and an inner surface of the inner fixed structure define an outlet section of an engine compartment therebetween; and
   wherein the outlet section ventilates an engine compartment airflow;
   the outlet section of the engine compartment comprising:
   a plurality of rigid spacers fixed to a periphery of a first surface of the outlet section, and wherein the plurality of rigid spacers define first and second sets of passages that each ventilate the engine compartment airflow at the outlet section;
   wherein the first set of passages are formed between adjacent rigid spacers; and
   wherein the second set of passages are formed in spaces within the plurality of rigid spacers;
   a plurality of longitudinal fingers, wherein each of the plurality of longitudinal fingers is attached to the plurality of rigid spacers at a first end and pressed against a second surface of the outlet section at a second end;
   a plurality of longitudinal slots formed between adjacent longitudinal fingers; and
   wherein each of the plurality of longitudinal fingers flex in response to relative movements of the turbojet with respect to the nacelle.

2. The nacelle as claimed in claim 1, wherein the plurality of longitudinal fingers form a valve.

3. The nacelle as claimed in claim 1, wherein the first surface of the outlet section is the inner surface of the inner fixed structure.

4. The nacelle as claimed in claim 1, wherein the first surface of the outlet section is the outer surface of the exhaust nozzle.

5. The nacelle as claimed in claim 1, wherein the plurality of rigid spacers comprise a plurality of U-shaped elements.

6. The nacelle as claimed in claim 1, wherein the plurality of longitudinal slots and the plurality of longitudinal fingers form a ring.

7. The nacelle as claimed in claim 1, wherein the second surface of the outlet section is the outer surface of the exhaust nozzle.

8. The nacelle as claimed in claim 1, wherein the second surface of the outlet section is the inner surface of the inner fixed structure.

9. An aircraft employing at least one nacelle as claimed in claim 1.

* * * * *